United States Patent
Orihara et al.

(10) Patent No.: US 10,185,913 B2
(45) Date of Patent: Jan. 22, 2019

(54) ANTENNA DEVICE AND ELECTRONIC APPARATUS

(71) Applicant: DEXERIALS CORPORATION, Tokyo (JP)

(72) Inventors: Katsuhisa Orihara, Tochigi (JP); Norio Saito, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/554,924

(22) PCT Filed: Mar. 2, 2016

(86) PCT No.: PCT/JP2016/056401
§ 371 (c)(1),
(2) Date: Aug. 31, 2017

(87) PCT Pub. No.: WO2016/143626
PCT Pub. Date: Sep. 15, 2016

(65) Prior Publication Data
US 2018/0089551 A1 Mar. 29, 2018

(30) Foreign Application Priority Data
Mar. 9, 2015 (JP) .................................. 2015-045738

(51) Int. Cl.
*G06K 19/00* (2006.01)
*G06K 19/077* (2006.01)
(Continued)

(52) U.S. Cl.
CPC ....... *G06K 19/07779* (2013.01); *G06K 19/07* (2013.01); *H01Q 1/2225* (2013.01);
(Continued)

(58) Field of Classification Search
CPC ............. G06K 19/07779; G06K 19/07; H01Q 1/2225; H01Q 1/24; H01Q 1/52; H01Q 7/06; H01Q 19/00
(Continued)

(56) References Cited

U.S. PATENT DOCUMENTS

2015/0249282 A1    9/2015   Orihara et al.

FOREIGN PATENT DOCUMENTS

| JP | 2005-234827 A | 9/2005 |
| JP | 2010-245776 A | 10/2010 |

(Continued)

OTHER PUBLICATIONS

May 17, 2016 Search Report issued in International Patent Application No. PCT/JP2016/056401.

*Primary Examiner* — Daniel A Hess
(74) *Attorney, Agent, or Firm* — Oliff PLC (57) ABSTRACT

The purpose is to provide an antenna device ensuring good communication performance using a magnetic shielding effect, even when an antenna is arranged at back surface cover side of an electronic apparatus, and an electronic apparatus incorporating this antenna device. An antenna device incorporated in an electronic apparatus and communicating with an external apparatus via an electromagnetic field signal, including: an antenna coil inductively coupled to the external apparatus and arranged by winding around a conducting wire such that conducting wires opposing in width direction via an opening will be close to each other; a thermal diffusion sheet opposing to the external apparatus and arranged inside of a housing of the electronic apparatus; and a conductive sheet overlapped with a part of the antenna coil and the thermal diffusion sheet.

11 Claims, 8 Drawing Sheets

(51) Int. Cl.
    *G06K 19/07*     (2006.01)
    *H01Q 1/24*     (2006.01)
    *H01Q 1/52*     (2006.01)
    *H01Q 7/06*     (2006.01)
    *H01Q 19/00*     (2006.01)
    *H01Q 1/22*     (2006.01)

(52) U.S. Cl.
    CPC ................ *H01Q 1/24* (2013.01); *H01Q 1/52* (2013.01); *H01Q 7/06* (2013.01); *H01Q 19/00* (2013.01); *H01Q 1/243* (2013.01)

(58) Field of Classification Search
    USPC ........................................................ 235/492
    See application file for complete search history.

(56) References Cited

FOREIGN PATENT DOCUMENTS

| | | |
|---|---|---|
| JP | 2010-252402 A | 11/2010 |
| JP | 2011-229133 A | 11/2011 |
| JP | 2012-217133 A | 11/2012 |
| WO | 2014/030662 A1 | 2/2014 |

ANTENNA DEVICE AND ELECTRONIC APPARATUS

BACKGROUND OF THE INVENTION

Field of the Invention

The present invention relates to an antenna device incorporated in an electronic apparatus and communicating with an external device such as a transmitter via an electromagnetic field signal, and an electronic apparatus incorporating this antenna device. The present application claims priority based on Japanese Patent Application Nos. 2015-045738 filed in Japan on Mar. 9, 2015, which is incorporated by reference herein.

Description of Related Art

In electronic apparatuses such as portable telephone, an antenna module for RFID (Radio Frequency Identification) has been used to mount a function of Near Field Communication. This antenna module communicates with an antenna coil mounted on a transmitter such as a reader/writer by using inductive coupling. That is, in this antenna module, a magnetic field from the reader/writer is received by an antenna coil and thereby converted into electric power, which can drive an IC which functions as a communication processing unit.

To reliably perform communication, the antenna module is required to receive, at the antenna coil, magnetic flux equal to or more than a certain value from the reader/writer. For this reason, in an antenna module according to a conventional example, a loop coil is provided in a housing of a portable telephone, and this coil receives magnetic flux from the reader/writer. In the antenna module incorporated in an electronic apparatus such as a portable telephone, magnetic flux from the reader/writer are caused to bounce back by eddy current occurring because the metal of a substrate, battery pack, or the like inside the apparatus receives a magnetic field from the reader/writer. For example, when considering with a housing surface of the portable telephone, the magnetic field coming from the reader/writer tends to be strong at an outer circumferential portion of the housing surface and weak at a portion near the center of the housing surface.

For an antenna using a normal loop coil, the loop coil has an opening which is positioned at a center portion of the portable telephone where a magnetic field passing through the above-described outer circumferential portion of the housing surface is not much received. Thus, in the antenna using the normal loop coil, efficiency of receiving magnetic field is poor. Hence, in a RFID antenna module incorporated in the electronic apparatus, a method for improving communication property by using a metal plate such as a substrate, and an antenna module in which a magnetic sheet is used to increase magnetic flux to enhance performance, have been suggested (for example, refer to Patent Literatures 1 to 4).

Patent Literature 1: JP 2010-245776 A
Patent Literature 2: JP 2010-252402 A
Patent Literature 3: JP 2011-229133 A
Patent Literature 4: JP 2012-217133 A

SUMMARY OF THE INVENTION

When incorporating a RFID antenna in an electronic apparatus such as portable telephone, it is important that a mounted position of the RFID antenna is near an end of a metal plate. For example, when arranging an antenna around a liquid crystal panel of smartphone or tablet PC, it is possible to improve performance by using the metal plate, a battery pack, a circuit board, or the like as a structure of the liquid crystal panel. However, when the antenna is mounted at back surface cover side separate from the metal plate for a reason of restriction in design of the electronic apparatus, there was a problem that the antenna cannot exert its performance sufficiently, as there is no metal substance to be used for improving communication performance of the antenna.

The present invention is invented considering the above problem, and the purpose of the present invention is to provide a new and improved antenna device capable of ensuring good communication performance even when an antenna is arranged at back surface cover side of an electronic apparatus, and the electronic apparatus incorporating this antenna device.

One embodiment of the present invention is an antenna device incorporated in an electronic apparatus, and communicating with an external device via an electromagnetic field signal, comprising: an antenna coil inductively coupled to the external device and arranged by winding around a conducting wire such that conducting wires opposing in width direction via an opening will be close to each other; a thermal diffusion sheet opposing to the external apparatus and arranged inside a housing of the electronic apparatus; and a conductive sheet overlapped with a part of the antenna coil and the thermal diffusion sheet.

According to one embodiment of the present invention, it is possible to ensure good communication performance of the antenna by a magnetic shielding effect of the thermal diffusion sheet.

At this time, in one embodiment of the present invention, the antenna coil may be divided into two, i.e. one side part in which conducting wires are wound around in one direction and other side part in which conducting wires are wound around in other direction, via a center line vertically sectioning the opening in a longitudinal direction, and the one side part may be arranged along an outer edge of the thermal diffusion sheet, and also, the other side part may be configured to overlap with the conductive sheet.

In this way, it is possible to ensure good communication performance of the antenna by the magnetic shielding effect of the thermal diffusion sheet, as magnetic flux from the external apparatus collected by the thermal diffusion sheet is transferred to a center part of the antenna coil via the conductive sheet.

In addition, in one embodiment of the present invention, it may further comprise a magnetic sheet formed by magnetic substance and arranged to overlap with a part of the antenna coil at opposite side of a surface of the antenna coil opposing to the external apparatus.

In this way, it is possible to improve communication property of the antenna efficiently by using the magnetic shielding effect of the thermal diffusion sheet, as magnetic flux from the external apparatus are collected and induced to the center part of the antenna coil by the magnetic sheet.

In addition, in one embodiment of the present invention, the antenna coil may be configured to be arranged such that the conducting wire is wound around in approximately rectangular shape.

In this way, good communication property can be achieved by reducing a deterioration of communication performance of the antenna by mutual cancelling out of induced voltages of the one side part and the other side part of the antenna coil, by using the magnetic shielding effect by the thermal diffusion sheet, especially even when the antenna coil is configured such that the conducting wire is wound around in elongated approximately rectangular shape.

In addition, in one embodiment of the present invention, the thermal diffusion sheet may be having a thickness at least equal to or more than skin depth calculated by a following formula.

$$d = \sqrt{\left(\frac{2}{\omega\mu\sigma}\right)}$$

$d$: Skin depth ($m$)

$\omega$: Angular frequency (rad/s)

$\mu$: Magnetic permeability ($H/m$)

$\sigma$: Conductivity ($S/m$)

In this way, it is possible to ensure good communication property of the antenna more certainly by using the magnetic shielding effect by the thermal diffusion sheet.

In addition, in one embodiment of the present invention, the thermal diffusion sheet may be formed from graphite.

In this way, it is possible to ensure good communication property of the antenna more certainly by using the magnetic shielding effect by a graphite sheet.

In addition, in other embodiment of the present invention, it is an electronic apparatus capable of communicating with the external apparatus via an electromagnetic field signal, wherein the antenna device described in any of the above is incorporated in the electronic apparatus.

In other embodiment of the present invention, it is possible to ensure good communication property of the antenna of the electronic apparatus with respect to the external apparatus, while improving freedom in design of the antenna device.

As explained above, in the present invention, it is possible to ensure good communication performance of the antenna, even when the antenna is arranged at back surface cover side of the electronic apparatus, by using the magnetic shielding effect by the thermal diffusion sheet provided in the electronic apparatus.

DETAILED DESCRIPTION OF THE INVENTION

Hereinafter, explaining in detail about preferred embodiments of the present invention. In addition, the embodiments explained in below will not unjustly limit the content of the present invention described in claims, and it is not limited that all the structures explained in the embodiments are necessary as means for solving the problem of the present invention.

Figure 1:
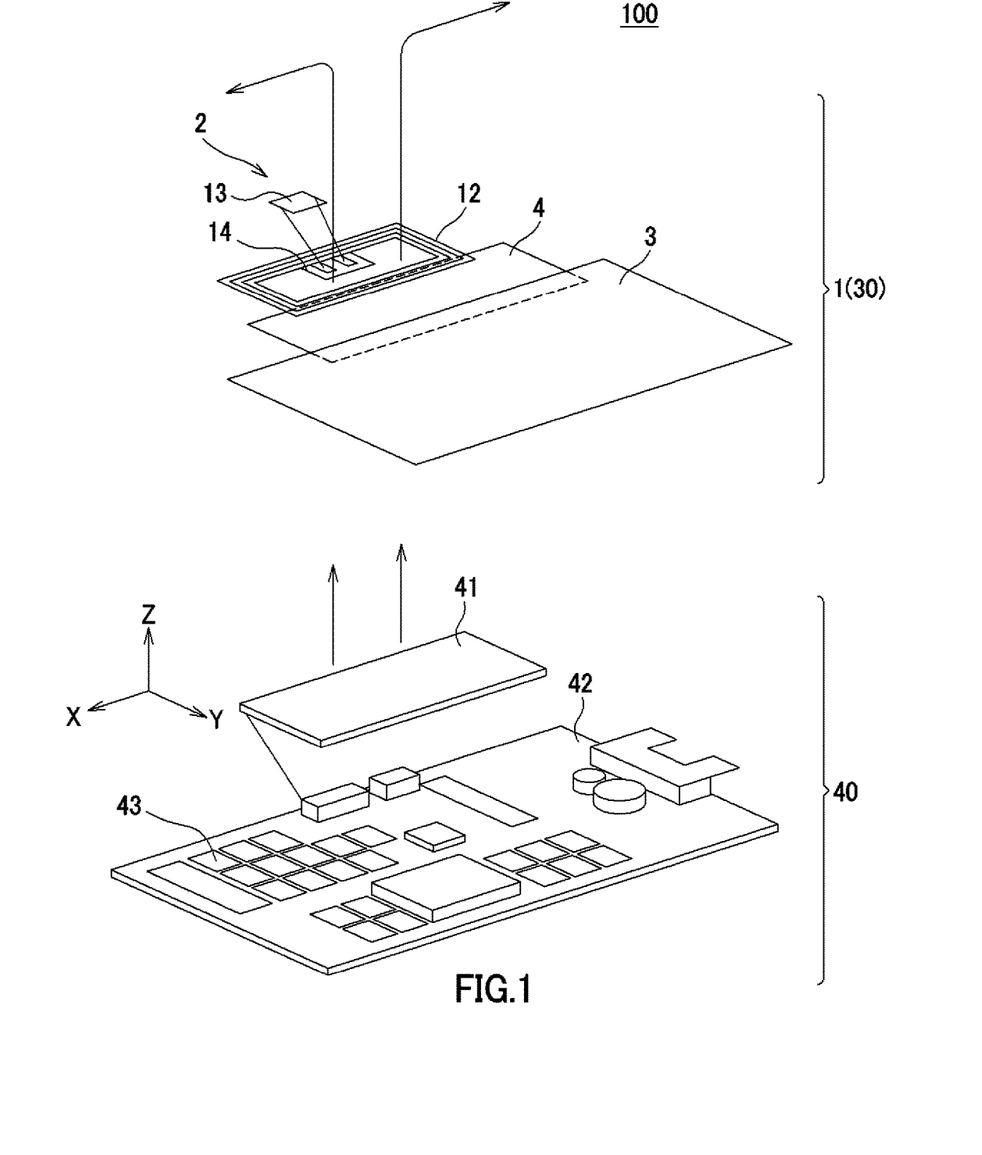
FIG. 1 is a perspective view illustrating a schematic structure of a wireless communication system applying an antenna device relating to one embodiment of the present invention.
Figure 2:
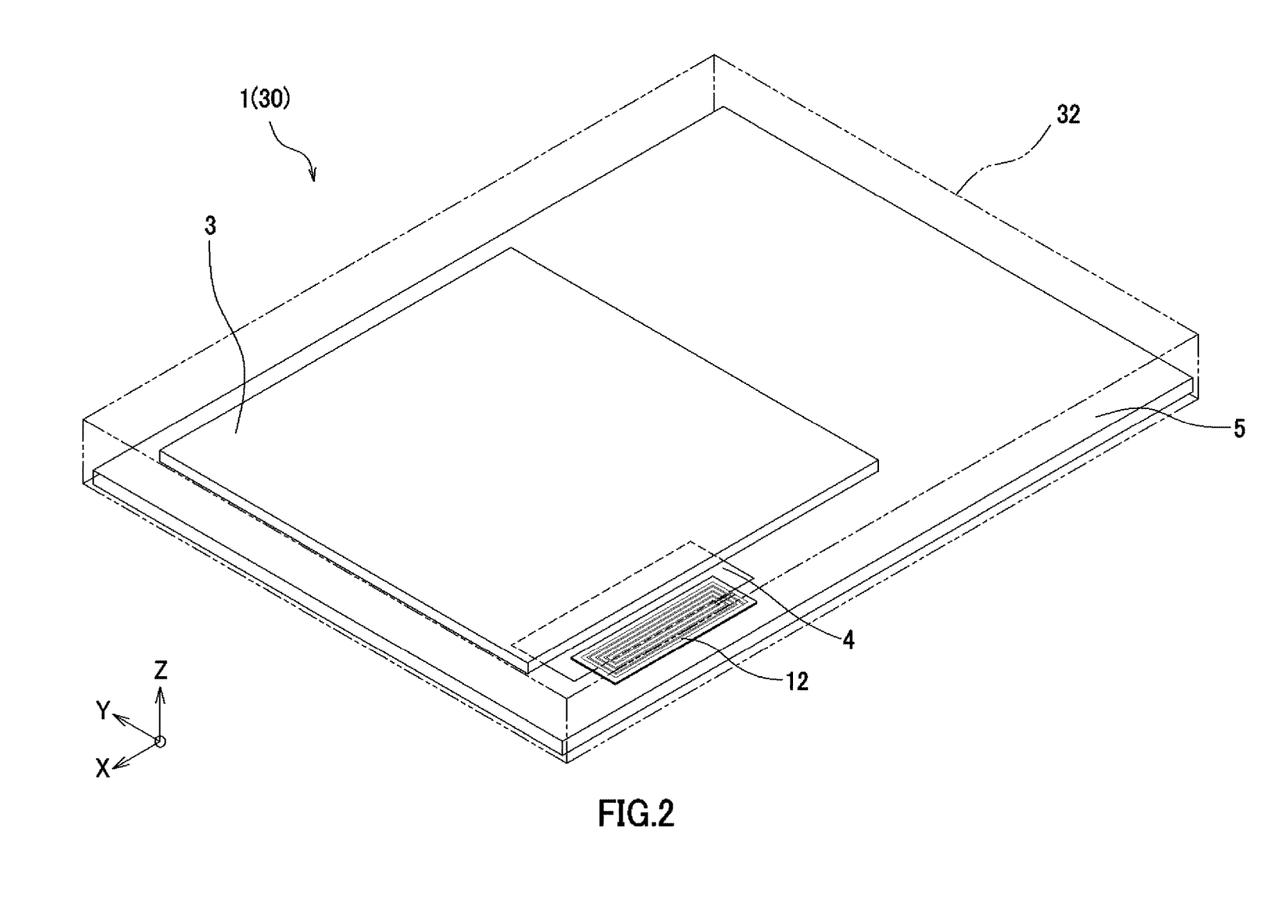
FIG. 2 is a perspective view illustrating an example of a schematic structure of an electronic apparatus having the antenna device relating to one embodiment of the present invention.
Figure 3:
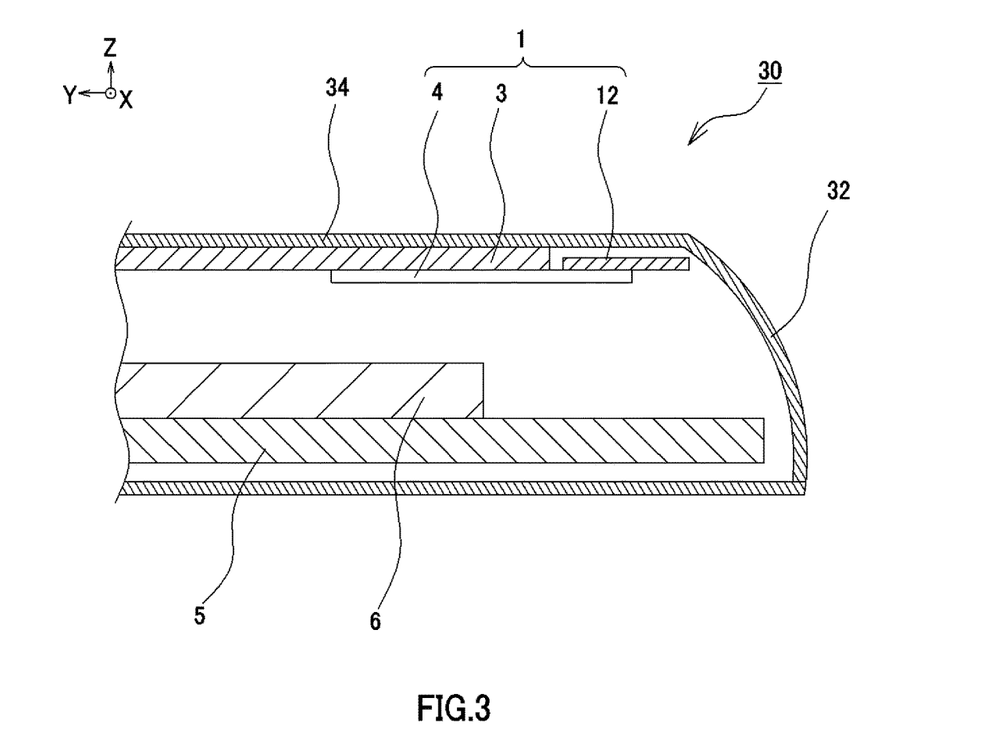
FIG. 3 is a sectional view for explaining about a structure of the antenna device relating to one embodiment of the present invention.

At first, explaining about a structure of an antenna device relating to one embodiment of the present invention, by using drawings. FIG. 1 a perspective view illustrating a schematic structure of a wireless communication system applying an antenna device relating to one embodiment of the present invention, FIG. 2 is a perspective view illustrating an example of a schematic structure of an electronic apparatus having the antenna device relating to one embodiment of the present invention, and FIG. 3 is a sectional view for explaining about a structure of the antenna device relating to one embodiment of the present invention. In addition, FIG. 3 is a sectional view in YZ plane of the antenna device illustrated in FIG. 2.

An antenna device 1 relating to this embodiment is incorporated in an electronic apparatus 30, and communicates with the external apparatus via an electromagnetic field signal, and for example, the antenna device 1 is used by incorporated in a wireless communication system 100 for RFID as illustrated in FIG. 1.

As illustrated in FIG. 1, the wireless communication system 100 comprises: the antenna device 1 provided in the electronic apparatus 30; and a reader/writer 40 which is the external apparatus for accessing to the antenna device 1. Here, the antenna device 1 and the reader/writer 40 are arranged to be opposed to each other in XY plane of three-dimensional orthogonal coordinate system XYZ illustrated in FIG. 1.

The reader/writer 40 functions as a transmitter for transmitting magnetic field in Z axis direction with respect to the antenna device 1 opposing to each other in XY plane, concretely, the reader/writer 40 comprises: an antenna 41 for transmitting magnetic field to the antenna device 1; and a control board 42 for communicating with the antenna device 1 inductively coupled via the antenna 41.

In other words, in the reader/writer 40, the control board 42 electrically connected to the antenna 41 is arranged. In this control board 42, a control circuit 43 consisting of electronic components such as one or plurality of integrated circuit chips is mounted. This control circuit 43 performs various processing based on data received from the antenna device 1.

For example, when transmitting data to the antenna device 1, the control circuit 43 encodes data, modulates carrier wave of a predetermined frequency (for example, 13.56 MHz) based on encoded data, amplifies modulated modulation signal, and drives the antenna 41 by amplified modulation signal. In addition, when reading out data from the antenna device 1, the control circuit 43 amplifies modulation signal of data received by the antenna 41, demodulates amplified modulation signal of data, and decodes demodulated data.

In addition, in the control circuit 43, an encoding system and a modulating system used in general reader/writer are used, and for example, Manchester encoding system and ASK (Amplitude Shift Keying) modulating system are used. In addition, it is explained about the antenna device or the like in a contactless communication system in the below, but same applies to a contactless charging system such as Qi.

As illustrated in FIG. 2, for example, the antenna device 1 is incorporated inside of a housing 32 of the electronic apparatus 30 such as portable telephone arranged to oppose the reader/writer 40 in XY plane. In this embodiment, the antenna device comprises: an antenna module 2 having an antenna substrate 11 (refer to FIG. 4) mounted with an antenna coil 12 capable of communicating with inductively coupled reader/writer 40; a communication processing unit 13 driven by current flowing in the antenna coil 12 for communicating with the reader/writer 40; and a thermal diffusion sheet 3.

The antenna module 2 is arranged inside of the housing 32 of the electronic apparatus 30, and communicates with inductively coupled reader/writer 40. In this embodiment, the antenna module 2 is mounted with, for example, the antenna coil 12 formed by patterning processing or the like of flexible conducting wire 12a such as flexible flat cable, and a terminal area 14 for electrically connecting the antenna coil 12 and the communication processing unit 13.

The antenna coil 12 will be magnetically coupled with the reader/writer 40 by inductive coupling when receiving magnetic field transmitted from the reader/writer 40, and the antenna coil 12 is having a function to receive modulated electromagnetic wave and to supply received signal to the communication processing unit 13 via the terminal area 14. In this embodiment, the antenna coil 12 is connected with the thermal diffusion sheet 3 arranged inside of the housing 32 of the electronic apparatus 30 via a conductive sheet 4 consisting of copper, aluminum or the like, and it is configured that a part of the antenna coil 12 is overlapped with the conductive sheet 4. In addition, detailed explanation of a structure of the antenna coil 12 will be described later.

The communication processing unit 13 is driven by current flowing in the antenna coil 12 and communicates with the reader/writer 40. Concretely, the communication processing unit 13 demodulates received modulation signal, decodes demodulated data, and writes decoded data into internal memory incorporated in the communication processing unit 13. In addition, the communication processing unit 13 reads out data to be transmitted to the reader/writer 40 from the internal memory, encodes read out data, modulates carrier wave based on encoded data, and transmits modulated electric wave to the reader/writer 40 via the antenna coil 12 magnetically coupled by inductive coupling. In addition, the communication processing unit 13 may be driven by electric power supplied from power supplying means such as external power supply or battery pack incorporated in the electronic apparatus, instead of electric power flowing in the antenna coil 12.

The thermal diffusion sheet 3 is arranged inside of the housing 32 of the electronic apparatus 30 and arranged to be opposed to an external apparatus 40, for preventing concentration of heat generated from electronic components 6 to the housing 32 in a part opposing to the electronic components 6 which generate heat when driving the electronic apparatus 30, in other words, for diffusing heat inside of the electronic apparatus 30. Concretely, as illustrated in FIG. 3, the thermal diffusion sheet 3 is arranged at a side of a back surface cover 34 of the housing 32, in which the back surface cover 34 consists of nonconductor such as resin, and which is a part opposing to the electronic components 6. A graphite sheet, a carbon fiber sheet, a shielding material, which is formed by etching a metal foil consisting of copper or the like in mesh shape, or the like is used as the thermal diffusion sheet 3. It is preferable to use the graphite sheet as the thermal diffusion sheet 3 from a point that it is excellent in functions such as thermal diffusivity, flame retardance, heat resistance, ignition prevention or the like.

In this embodiment, the graphite sheet formed from graphite at least having a thickness equal to or more than skin depth calculated by a following formula (1) is used as the thermal diffusion sheet 3. In addition, d in the following formula (1) indicates skin depth (m), which is a depth that current will be 1/e (approximately 0.37) times of surface current, w indicates angular frequency (rad/s) which will be a value of 2 πf when frequency of current is f, μ indicates magnetic permeability (H/m), and σ indicates conductivity (S/m).

$$d = \sqrt{\left(\frac{2}{\omega\mu\sigma}\right)} \quad (1)$$

As illustrated in a following Table 1, conductivity of graphite is lower than conductivity of copper, but it is possible to ensure a certain amount of high conductivity by making a thickness of skin depth of graphite equal to or more than a predetermined size which is several times larger than a thickness of skin depth of copper. Here, the antenna device 1 relating to one embodiment of the present invention improves communication performance of the antenna by using a magnetic shielding effect by the thermal diffusion sheet 3.

TABLE 1

| Material | Conductivity | Skin depth | Comparison of skin depth with copper |
|---|---|---|---|
| Copper | 5.80E+07 | 1.80E−05 | 1 |
| Graphite (HFSS) | 7.00E+04 | 5.17E−04 | 28.8 |
| Graphite (made by GrafTech) | 1.90E+06 | 9.92E−05 | 5.5 |
| Graphite (PGS made by Panasonic) | 1.00E+06 | 1.37E−04 | 7.6 |

As illustrated in FIG. 3, a metal plate 5 is arranged in the housing 32 of the electronic apparatus 30, and it is a first conductor opposing to the reader/writer 40 which is the external apparatus. The metal plate 5 is arranged in the housing of the electronic apparatus, for example portable telephone, smartphone, tablet PC, or the like, and it is configured to be the first conductor opposing to the reader/writer 40 when communicating with the antenna module 2. A metal cover attached to inner surface of the housing of a smartphone, a metal housing of a battery pack contained in the smartphone, or a metal plate arranged at back surface of liquid crystal module of a tablet PC corresponds to the first conductor.

The metal plate 5 of the battery pack carries electricity comparatively smoothly, so eddy current occurs when AC magnetic field is added from outside and magnetic field will be bounced back. When examining magnetic field distribution at the time of addition of such AC magnetic field from outside, it is having a property that magnetic field at end side of the metal plate 5 opposing to the reader/writer 40 is strong. Therefore, conventionally, the antenna coil 12 of the antenna module 2 was arranged at outer edge side of the metal plate 5 of battery pack or the like arranged inside of the housing 32 of a portable telephone 30, in order to ensure good communication property with the reader/writer 40, while downsizing the electronic apparatus 30 when incorporating the antenna module 2 in the electronic apparatus 30 such as portable telephone.

However, there is a case that the antenna coil 12 cannot be arranged at outer edge side of the metal plate 5, as space for arranging the antenna coil 12 at outer edge side of the metal plate 5 cannot be secured sufficiently in the housing 32, along with multifunctioning and downsizing of the electronic apparatus 30. In other words, it is concerned that communication property of the antenna cannot be improved sufficiently using the magnetic shielding effect by the metal plate 5, because the antenna coil 12 cannot be arranged at outer edge side of the metal plate 5.

As a result of earnest investigation for achieving the above purpose of the present invention, the inventors have found that it is possible to ensure good communication property of the antenna by the magnetic shielding effect, by arranging the antenna coil 12 at outer edge side of the thermal diffusion sheet 3, as well as arranging the antenna coil 12 at outer edge side of the metal plate 5. In other words, the inventors have found that it is also possible to ensure good communication property of the antenna more certainly by using the magnetic shielding effect of the thermal diffusion sheet 3, as well as the metal plate 5.

Here, in this embodiment, communication performance of the antenna is ensured by using the magnetic shielding effect by the thermal diffusion sheet 3 arranged for the purpose of thermal diffusion in the housing of the electronic apparatus 30, instead of the metal plate 5. And, even in the case that there is no space for arranging the antenna coil 12 at outer edge side of the metal plate 5, good communication performance of the antenna is ensured by arranging the antenna coil 12 at outer edge side of the thermal diffusion sheet 3 arranged just above of the back surface cover 34, which is a part opposing to the electronic components 6, which are heat source of the electronic apparatus 30.

In this way, in this embodiment, it is possible to improve communication property of the electronic apparatus 30 with respect to the external apparatus 40, while improving freedom in design of the antenna device 1, by improving communication property of the antenna by the magnetic shielding effect of the thermal diffusion sheet 3, by arranging the antenna coil 12 at outer edge side of the thermal diffusion sheet 3. In addition, it is possible to improve communication performance of downsized NFC antenna using the magnetic shielding effect by the thermal diffusion sheet 3, even when the NFC antenna is mounted on the back surface cover 34 side separated from the metal plate 5 of the electronic apparatus 30.

Figure 4:
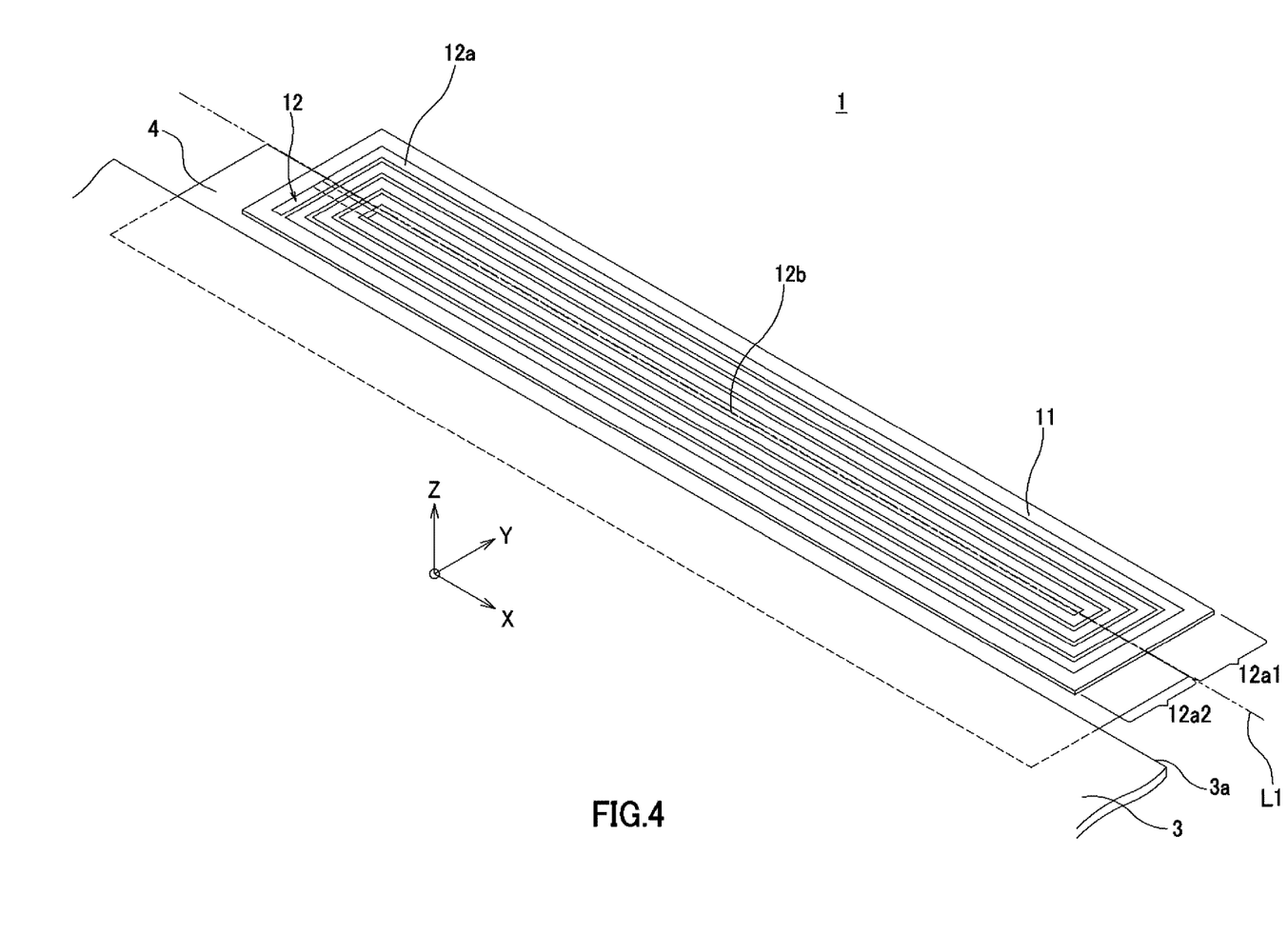
FIG. 4 is a perspective view illustrating a schematic structure of an antenna device relating to one embodiment of the present invention.

Next, explaining in detail about a structure of an antenna device relating to one embodiment of the present invention, using the drawings. FIG. 4 is a perspective view illustrating a schematic structure of an antenna device relating to one embodiment of the present invention.

The antenna coil 12 is formed by patterning processing the flexible conducting wire 12a on a surface of the antenna substrate 11 composed of an elastic flexible substrate or the like. As illustrated in FIG. 4, the antenna coil 12 is formed in an elongated approximately rectangular shape in a longitudinal direction, and one conducting wire 12a is wound around along the contour, and its center side is being an opening 12b. In other words, the antenna coil 12 is arranged by winding around a conducting wire 12a such that conducting wires 12a opposing in width direction (Y direction in FIG. 4) via its opening 12b will be close to each other. In addition, the antenna coil 12 is arranged such that a main surface in which the conducting wire 12a is wound around will be opposing to the reader/writer 40 in XY plane illustrated in FIG. 1 at the time of communication.

The antenna coil 12 is divided into two, i.e. one side part 12a1 in which conducting wires 12a are wound around in one direction and other side part 12a2 in which conducting wires 12a are wound around in other direction, via a center line L1 vertically sectioning the opening 12b in a longitudinal direction. And, the one side part 12a1 is arranged along an outer edge 3a of the thermal diffusion sheet 3, and also, the other side part 12a2 is configured to overlap with the conductive sheet 4.

Concretely, as illustrated in FIG. 4, the antenna coil 12 is configured that only the other side part 12a2 is overlapped with the conductive sheet 4, and the one side part 12a1 is not overlapped with the conductive sheet 4 and arranged outside of the conductive sheet 4 along the outer edge 3a of the thermal diffusion sheet 3, and also, that the conductive sheet 4 is overlapped with the thermal diffusion sheet 3. In other words, the antenna coil 12 is configured that only a part thereof, i.e. the other side part 12a2 is overlapped with the conductive sheet 4, and a side of the conductive sheet 4 opposite to a side part overlapped with the other side part 12a2 is overlapped with a surface of the thermal diffusion sheet 3 opposite to a surface opposing to the external apparatus 40.

Therefore, it is possible to ensure good communication performance of the antenna by the magnetic shielding effect of the thermal diffusion sheet 3, as magnetic flux from the external apparatus 40 collected by the thermal diffusion sheet 3 is transferred to a center part of the opening 12b side of the antenna coil 12 via a conductive sheet 4. Especially, in this embodiment, it is possible to achieve good communication property by reducing deterioration of communication performance by cancelling out of induced voltages of the one side part 12a1 and the other side part 12a2 of the antenna coil 12 to each other, by using the magnetic shielding effect of the thermal diffusion sheet 3, even when the antenna coil 12 is configured such that the conducting wire 12a is wound around in elongated approximately rectangular shape.

Figure 5:
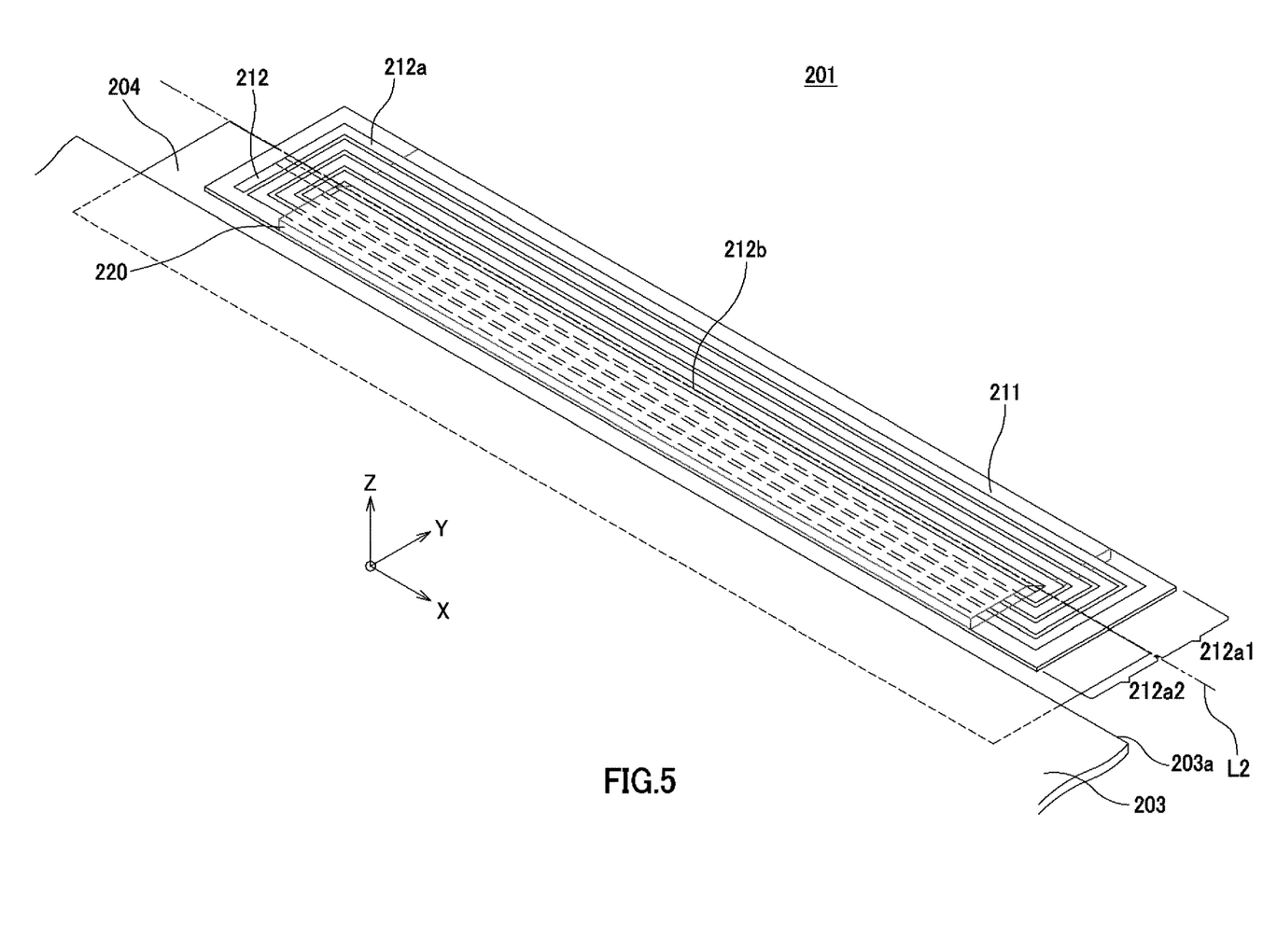
FIG. 5 is a perspective view illustrating a schematic structure of an antenna device relating to other embodiment of the present invention.

In addition, as illustrated in FIG. 5, communication performance of an antenna may be improved by inserting a magnetic sheet 220 formed by magnetic substance such as iron oxide, chromium oxide, cobalt or ferrite through an opening 212b of an antenna coil 212 of an antenna device 201. The magnetic sheet 220 provided in the antenna device 201 relating to other embodiment of the present invention is arranged to overlap with at least a part of the antenna coil 212 at opposite side of a surface of the antenna coil 212 opposing to the external apparatus 40.

In addition, the antenna coil 212 is formed by patterning processing a flexible conducting wire 212a by winding it around in approximately rectangular shape on a surface of an antenna substrate 211 composed of an elastic flexible substrate or the like, as well as the above one embodiment of the present invention. And, it is configured that one side part 212a1 of the antenna coil 212 is arranged along an outer edge 203a of a thermal diffusion sheet 203, and also, that other side part 212a2 is overlapped with a conductive sheet 204.

Figure 6A:
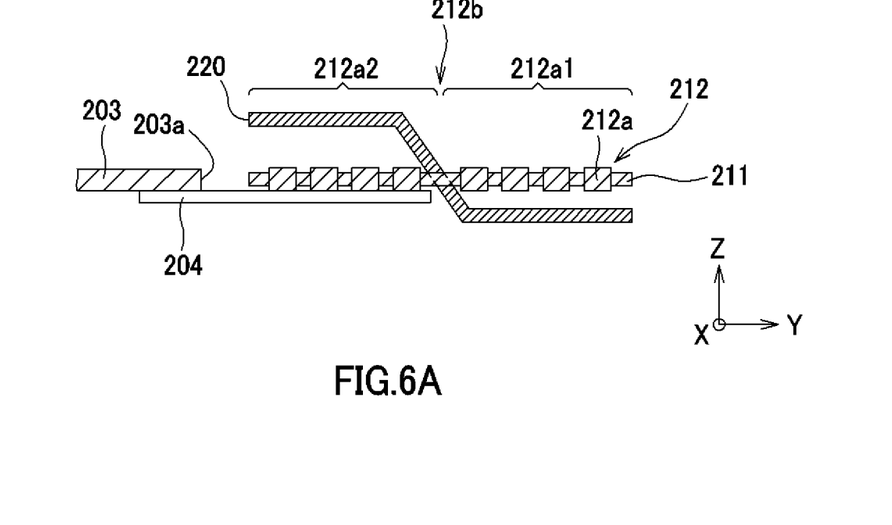
FIG. 6A is a sectional view illustrating a schematic structure of the antenna device relating to other embodiment of the present invention.

As illustrated in FIGS. 5 and 6A, in this embodiment, the magnetic sheet 220 is inserted through the opening 212b of the antenna coil 212, and the one side part 212a1 of the antenna coil 212 is overlapped with the magnetic sheet 220 at a surface opposite to a surface opposing to the external apparatus 40, and also, the other side part 212a2 is overlapped with the magnetic sheet 220 at a surface opposing to the external apparatus 40. In this way, it is possible to collect magnetic flux from the external apparatus 40 and to induce it to a center part of the antenna coil 212, when communicating with the external apparatus 40, by attaching the magnetic sheet 220 to the antenna coil 212.

Figure 6B:
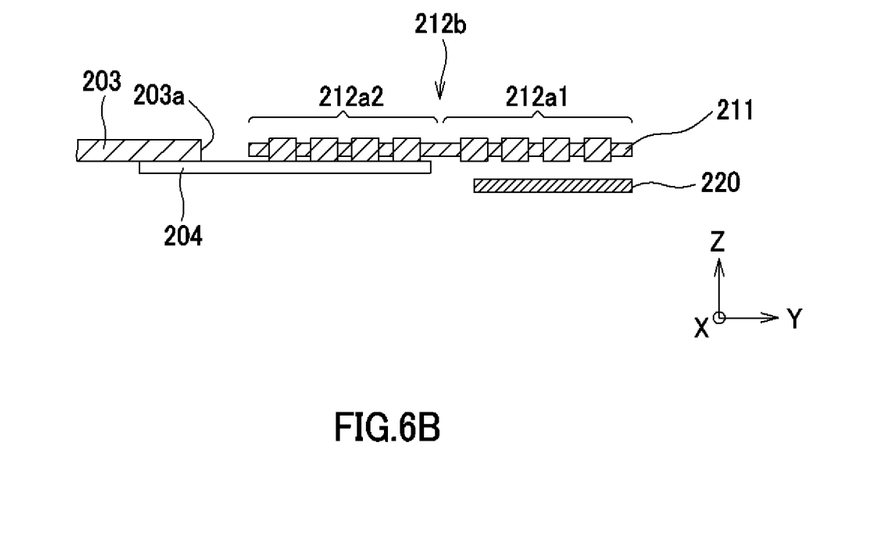
FIG. 6B is a sectional view illustrating a schematic structure of a modified example of the antenna device relating to other embodiment of the present invention.

Therefore, it is possible to efficiently improve communication property of the antenna using the magnetic shielding effect by the thermal diffusion sheet 203. In addition, as illustrated in FIG. 6B, the magnetic sheet 220 may be configured to overlap with the one side part 212a1 only, as the magnetic sheet 220 should be arranged to overlap with at least a part of the antenna coil 212 at a surface of the antenna coil 212 opposite to a surface opposing to the external apparatus 40.

Examples

Next, explaining about examples of verification and evaluation of an antenna device relating to one embodiment of the present invention, using drawings. In addition, the present invention should not be limited by the examples.

Figure 7:
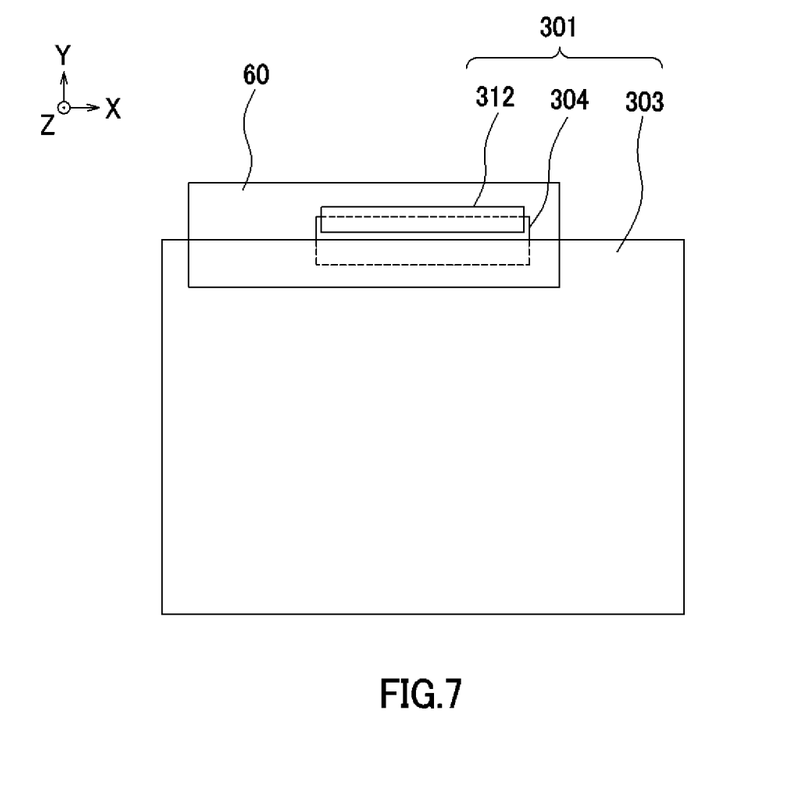
FIG. 7 is a plan view for explaining about an evaluation test for confirming function and effect of the antenna device relating to one embodiment of the present invention.

At first, explaining about a basic verification and evaluation about a relation of induced voltage generated at an antenna coil and a quality of material of a plate-like member of a metal plate or the like, which will be a source for the magnetic shielding effect, connected to the antenna coil via a conductive sheet of the antenna device relating to one embodiment of the present invention, using drawings. FIG. 7 is a plan view for explaining about an evaluation test for confirming function and effect of the antenna device relating to one embodiment of the present invention, and FIG. 8 is a graph illustrating an evaluation result in the evaluation test for confirming function and effect of the antenna device relating to one embodiment of the present invention.

As illustrated in FIG. 7, in the evaluation test, an antenna device 301 was formed as NFC antenna by connecting a plate-like member 303 of various materials to an aluminum foil of 30 mm×8 mm×0.05 mm attached as a conductive sheet 304 at lower surface of an antenna coil 312 of 30 mm×8 mm. And, a magnitude of induced voltage of the antenna coil 312 measured by a voltage measuring device 60 was compared by moving the voltage measuring device 60 in Y axis direction illustrated in FIG. 7 to just above the antenna coil 312. In this embodiment, magnitude of induced voltage of the antenna coil 312 in the cases of using Cu with thickness of 0.035 mm, Al with thickness of 0.5 mm, SUS with thickness of 0.3 mm, graphite sheet with thickness of 0.12 mm, and Air provided with nothing, as the plate-like member 303, was compared.

Figure 8:
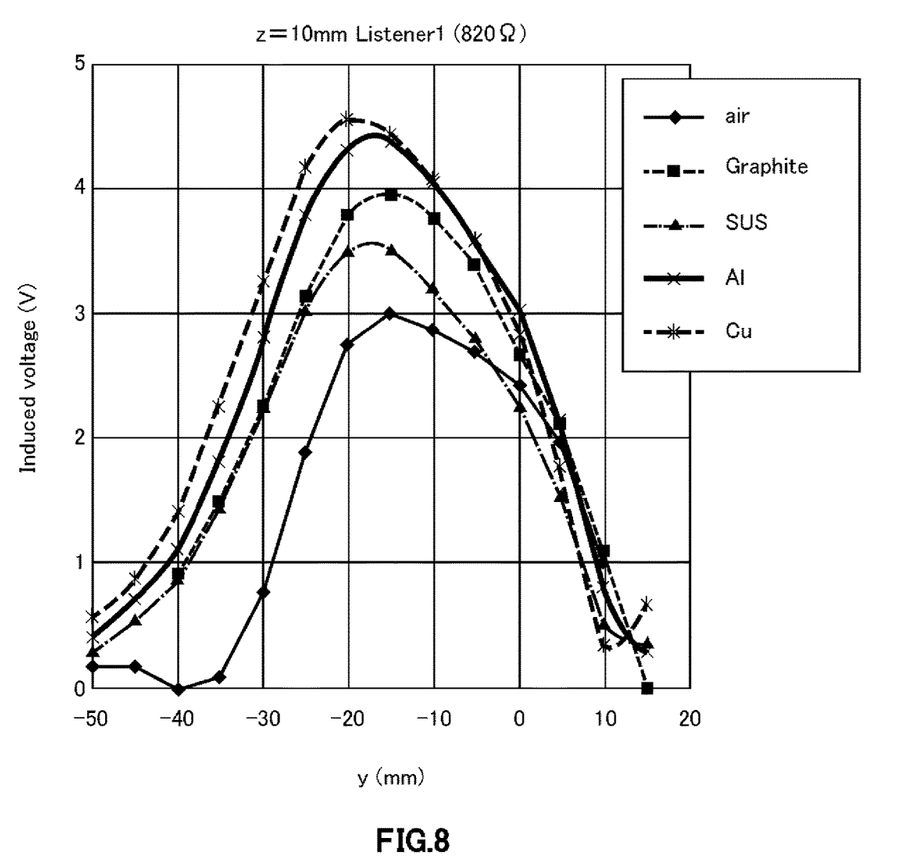
FIG. 8 is a graph illustrating an evaluation result in the evaluation test for confirming function and effect of the antenna device relating to one embodiment of the present invention.

The evaluation result in the evaluation test is illustrated in FIG. 8. As illustrated in FIG. 8, when graphite was used as the plate-like member 303 to be connected to the antenna coil 312, it can be understood that induced voltage generated at the antenna coil 312 was somewhat lower compared to the case using aluminum or copper, which is good conductor metal. From this, it can be understood that graphite was inferior to aluminum or copper in conductivity, so its magnetic shielding effect was also inferior to aluminum or copper, and communication property of the antenna was also somewhat inferior to aluminum or copper.

However, as illustrated in FIG. 8, when graphite was used as the plate-like member 303 to be connected to the antenna coil 312, it can be understood that induced voltage generated at the antenna coil 312 was somewhat higher compared to the case using SUS. From this, it can be understood that the magnetic shielding effect by graphite was superior to the magnetic shielding effect by SUS, the conductivity of which was somewhat lower than aluminum or copper, so communication property of the antenna was superior. In other words, it can be understood that graphite was able to ensure good communication performance of the antenna by the magnetic shielding effect, by ensuring a sheet thickness. In other words, it can be understood that it was possible to ensure good communication performance of the antenna, even by the magnetic shielding effect using a graphite sheet arranged in the housing for diffusing heat inside of the electronic apparatus.

In addition, we have explained in detail about each embodiment and each example of the present invention as above, but it would be easy for those who skilled in the art to understand that various modifications are possible without substantively departing from new matters and effect of the present invention. Therefore, all of these modifications should be included in a scope of the present invention.

For example, terms described with different terms having broader or equivalent meaning at least once in description and drawings can be replaced with these different terms in any part of description and drawings. In addition, configuration and operation of the touch pad antenna device and the electronic apparatus are also not limited to those explained in each embodiment and each example of the present invention and it can be performed with various modifications.

GLOSSARY OF DRAWING REFERENCES 1, 201 Antenna Device
2 Antenna Module
3, 203 Thermal Diffusion Sheet
3a, 203a Outer Edge (of Thermal Diffusion Sheet)
4, 204 Conductive Sheet
5 Metal Plate (First Conductor)
6 Electronic Components
11, 211 Antenna Substrate
12, 212 Antenna Coil
12a, 212a Conducting Wire
12a1, 212a1 One Side Part
12a2, 212a2 Other Side Part
12b, 212b Opening
13 Communication Processing Unit
14 Terminal Area
20 Magnetic Sheet
30 Electronic Apparatus
32 Housing
40 Reader/Writer (External Apparatus)
41 Antenna
42 Control Board
43 Control Circuit
L1, L2 Center Line

The invention claimed is:

1. An antenna device incorporated in an electronic apparatus and communicating with an external apparatus via an electromagnetic field signal, comprising:
   an antenna coil inductively coupled to the external apparatus and arranged by winding around a conducting wire such that conducting wires opposing in width direction via an opening will be close to each other;
   a thermal diffusion sheet opposing to the external apparatus and arranged inside of a housing of the electronic apparatus; and
   a conductive sheet overlapped with a part of the antenna coil and the thermal diffusion sheet,
   wherein the thermal diffusion sheet is formed from graphite.

2. The antenna device according to claim 1, wherein the antenna coil is divided into one side part in which conducting wires are wound around in one direction and other side part in which conducting wires are wound around in other direction, via a center line vertically sectioning the opening in a longitudinal direction, and the antenna coil is configured such that the one side part is spaced from outer edge of the thermal diffusion sheet, and the other side part is overlapped with the conductive sheet.

3. The antenna device according to claim 2, further comprising a magnetic sheet formed by magnetic substance and arranged to overlap with a part of the antenna coil at opposite side of a surface of the antenna coil opposing to the external apparatus.

4. The antenna device according to claim 3, wherein the thermal diffusion sheet is having a thickness at least equal to or more than skin depth calculated by a following formula:

$$d = \sqrt{\left(\frac{2}{\omega\mu\sigma}\right)}$$

$d$: Skin depth $(m)$ $\omega$: Angular frequency $(rad/s)$ $\mu$: Magnetic permeability $(H/m)$ $\sigma$: Conductivity $(S/m)$.

5. The antenna device according to claim 2, wherein the thermal diffusion sheet is having a thickness at least equal to or more than skin depth calculated by a following formula:

$$d = \sqrt{\left(\frac{2}{\omega\mu\sigma}\right)}$$

$d$: Skin depth $(m)$ $\omega$: Angular frequency $(rad/s)$ $\mu$: Magnetic permeability $(H/m)$ $\sigma$: Conductivity $(S/m)$.

6. The antenna device according to claim 1, further comprising a magnetic sheet formed by magnetic substance and arranged to overlap with a part of the antenna coil at opposite side of a surface of the antenna coil opposing to the external apparatus.

7. The antenna device according to claim 6, wherein the thermal diffusion sheet is having a thickness at least equal to or more than skin depth calculated by a following formula:

$$d = \sqrt{\left(\frac{2}{\omega\mu\sigma}\right)}$$

$d$: Skin depth $(m)$ $\omega$: Angular frequency $(rad/s)$ $\mu$: Magnetic permeability $(H/m)$ $\sigma$: Conductivity $(S/m)$.

8. The antenna device according to claim 1, wherein the antenna coil is configured to be arranged such that the conducting wire is wound around in approximately rectangular shape.

9. The antenna device according to claim 8, wherein the thermal diffusion sheet is having a thickness at least equal to or more than skin depth calculated by a following formula:

$$d = \sqrt{\left(\frac{2}{\omega\mu\sigma}\right)}$$

$d$: Skin depth $(m)$ $\omega$: Angular frequency $(rad/s)$ $\mu$: Magnetic permeability $(H/m)$ $\sigma$: Conductivity $(S/m)$.

10. The antenna device according to claim 1, wherein the thermal diffusion sheet is having a thickness at least equal to or more than skin depth calculated by a following formula:

$$d = \sqrt{\left(\frac{2}{\omega\mu\sigma}\right)}$$

$d$: Skin depth $(m)$ $\omega$: Angular frequency $(rad/s)$ $\mu$: Magnetic permeability $(H/m)$ $\sigma$: Conductivity $(S/m)$.

11. An electronic apparatus capable of communicating with the external apparatus via an electromagnetic field signal, wherein the antenna device according to claim 1 is incorporated in the electronic apparatus.

* * * * *